United States Patent
Lee

(10) Patent No.: US 12,049,976 B2
(45) Date of Patent: Jul. 30, 2024

(54) IRRIGATION-SYSTEM-COUPLING DEVICE AND METHODS OF USE

(71) Applicant: Joe Schmoe Innovations, LLC, Aurora, CO (US)

(72) Inventor: Joseph M. Lee, Aurora, CO (US)

(73) Assignee: Joe Schmoe Innovations, LLC, Aurora, CO (US)

( * ) Notice: Subject to any disclaimer, the term of this patent is extended or adjusted under 35 U.S.C. 154(b) by 61 days.

(21) Appl. No.: 17/962,533

(22) Filed: Oct. 9, 2022

(65) Prior Publication Data

US 2024/0117912 A1  Apr. 11, 2024

(51) Int. Cl.
*F16L 37/50* (2006.01)
*F16L 15/02* (2006.01)
*F16L 33/22* (2006.01)

(52) U.S. Cl.
CPC .......... *F16L 37/505* (2013.01); *F16L 15/02* (2013.01); *F16L 33/223* (2013.01)

(58) Field of Classification Search
CPC ........ F16L 15/02; F16L 33/223; F16L 37/505
See application file for complete search history.

(56) References Cited

U.S. PATENT DOCUMENTS

| | | |
|---|---|---|
| 883,941 A | 4/1908 | Eagan |
| 988,423 A | 4/1911 | Wittlekopf |
| 1,307,273 A | 6/1919 | Salley |
| 1,851,992 A | 4/1932 | Smith |
| 2,246,436 A | 6/1941 | Downey |
| 2,516,743 A | 7/1950 | Downey |
| 2,672,924 A | 3/1954 | Anthes |
| 3,032,358 A | 5/1962 | Rolston |
| 3,667,785 A | 6/1972 | Kapeker |
| 3,740,061 A | 6/1973 | Jensen |
| 4,281,856 A | 8/1981 | Litman et al. |
| 4,434,811 A | 3/1984 | Murdoch |
| 4,659,116 A | 4/1987 | Cameron |
| 4,905,766 A | 3/1990 | Dietz et al. |
| 5,029,904 A | 7/1991 | Hunt |
| 5,039,133 A | 8/1991 | Albrecht |
| 5,275,447 A * | 1/1994 | McNab ................. F16L 33/223 |
| 5,403,046 A | 4/1995 | Kooten |
| 2019/0063650 A1* | 2/2019 | O'Mahony ........... F16L 33/223 |

FOREIGN PATENT DOCUMENTS

CN          114165661 A  *  3/2022

* cited by examiner

*Primary Examiner* — Zachary T Dragicevich
(74) *Attorney, Agent, or Firm* — Terrence M. Wyles, Esq.; Startup IP Law, LLC

(57) ABSTRACT

What is disclosed is an improved irrigation-system-coupling device, with a length-adjustment feature, that is designed to provide a coupling between polymeric irrigation-system hosing/tubing and a water-supply valve, such as solenoid-operated control/supply valves commonly used in automated irrigation systems. The length-adjustment configuration allows for easy installation in the field without the need to splice additional lengths of hosing/tubing in situations where various environmental conditions and/or necessitated repairs to or removal of sections of hoses/tubing has caused an extra gap between a supply-valve manifold housing and the end of the existing hose/tubing.

20 Claims, 12 Drawing Sheets

IRRIGATION-SYSTEM-COUPLING DEVICE AND METHODS OF USE

BACKGROUND

This invention relates to devices of the class used for joining fluid carrying conduits. More specifically, the invention is a coupler used to connect irrigation polymeric tubing or hoses, meaning either the connecting of two lengths of tubing or hose to each other, or the connecting of one tube or hose to a threaded plumbing fixture.

Underground lawn-sprinkling systems and other underground irrigation systems generally are comprised of varying lengths of polyethylene hose and/or tubing. Such underground systems are subjected to dimensional changes due to ground shifting and freeze-thaw cycles. Moreover, after an underground watering/irrigation system is installed, inevitably there are repairs required and hoses/tubing sections are replaced and it is necessary to remake system connections for the fluid conduit. One specific connection that must be made is a connection from the hose/tubing to the water-supply manifold via one or more solenoid-operated valves, which typically have a female threaded receptacle. Due to the aforementioned varying conditions that can vary the gap between outlet hoses/tubing and their supply valves in the water-supply manifold, existing couplers typically require the addition or subtraction of hose/tubing length in order to effect the required length to make an effective coupling. This is time-consuming and necessitates additional work and the introduction of additional points of system failures/leaks.

Therefore, there is a need for a coupler that can be installed in such irrigation systems without the need to overly manipulate existing hose/tubing, yet be able to adapt to varying length needs. Such an improved coupler need to be able to dimensionally shorten or lengthen as needed by installation personnel.

BRIEF SUMMARY

The inventive disclosures described herein pertain to an improved irrigation-system-coupling device that is designed to provide a coupling between polymeric irrigation-system hosing/tubing and a water-supply valve, such as solenoid-operated control/supply valves commonly used in automated irrigation systems, wherein coupling device incorporates an easy-to-use length-adjustable configuration. The length-adjustment configuration allows for easy installation in the field without the need to splice additional lengths of hosing/tubing in situations where various environmental conditions and/or necessitated repairs to or removal of sections of hoses/tubing has caused an extra gap between a supply-valve manifold housing and the end of the existing hose/tubing.

The improved coupling device features, among other things: a first-end-coupling member featuring helically threads for coupling with a supply valve; a first-end housing that has a plurality of flattened surfaces such that users can apply a wrench or channel locks to thread the first-end-coupling member into a supply-valve housing; a second-end-coupler member that has a plurality of parallel annular ridges that are typically saw-toothed or barbed in shape adapted to be inserted into a polymeric hose or tube; and a length-adjusting assembly that is comprised of an extension to the second-end-coupler member that includes a sealing O-ring and some exterior "lead-screw" type of threads that are engaged by a rotatable length-adjustment flange that has interior gear teeth adapted to engage with the lead-screw threads and convert rotating movement into linear movement of the first-end housing and its first-end-coupling member The foregoing Brief Summary is intended to merely provide a short, general overview of the inventive disclosure described throughout this patent application, and therefore, is not intended to limit the scope of the inventive disclosure contained throughout the balance of this patent application, including any appended claims and drawings.

DETAILED DESCRIPTION

I. Overview

Figure 1:
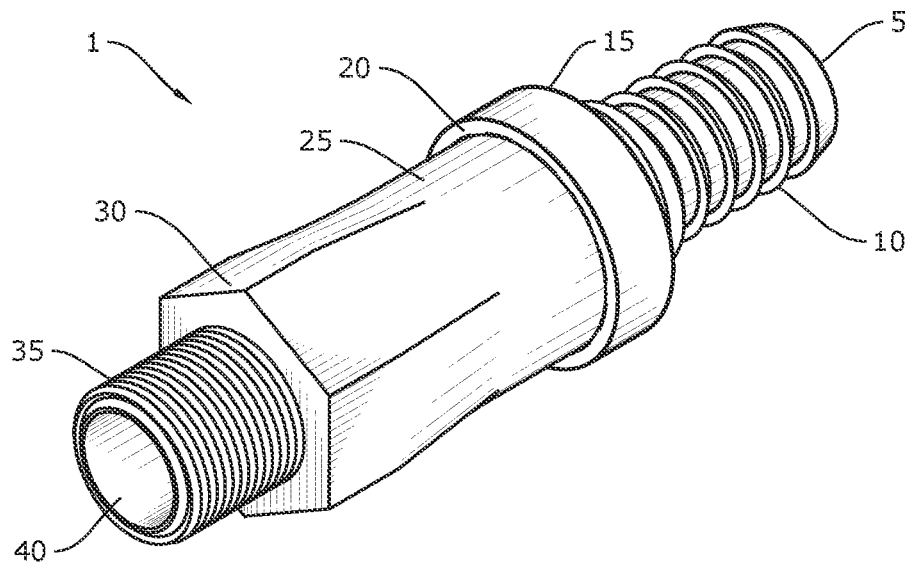
FIG. 1 depicts one embodiment of a perspective view of an improved irrigation-system-coupling device, in its non-extended configuration, as viewed from its first end (that is, from the end that is adapted to be threaded into a valve housing).
Figure 2:
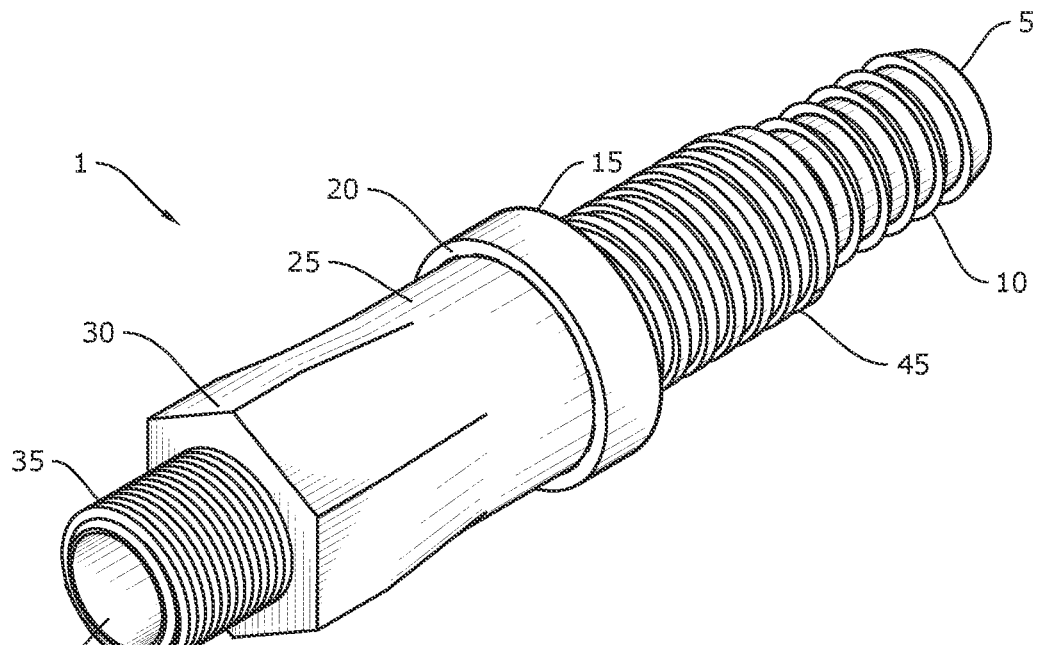
FIG. 2 depicts one embodiment of a perspective view of an improved irrigation-system-coupling device, in its extended configuration, as viewed from its first end (that is, from the end that is adapted to be threaded into a valve housing).
Figure 3:
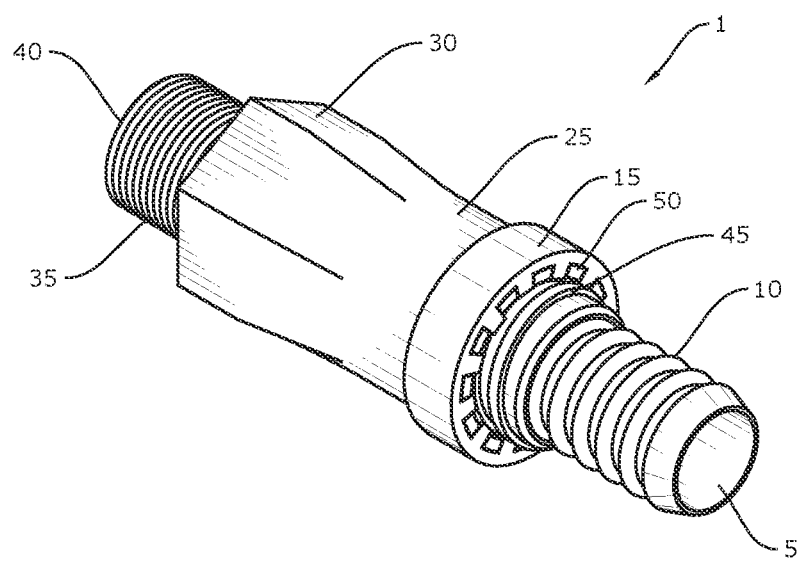
FIG. 3 depicts one embodiment of a perspective view of an improved irrigation-system-coupling device, in its non-extended configuration, as viewed from its second end (that is, from the end that is adapted to be fit into irrigation-system hosing/tubing).
Figure 4:
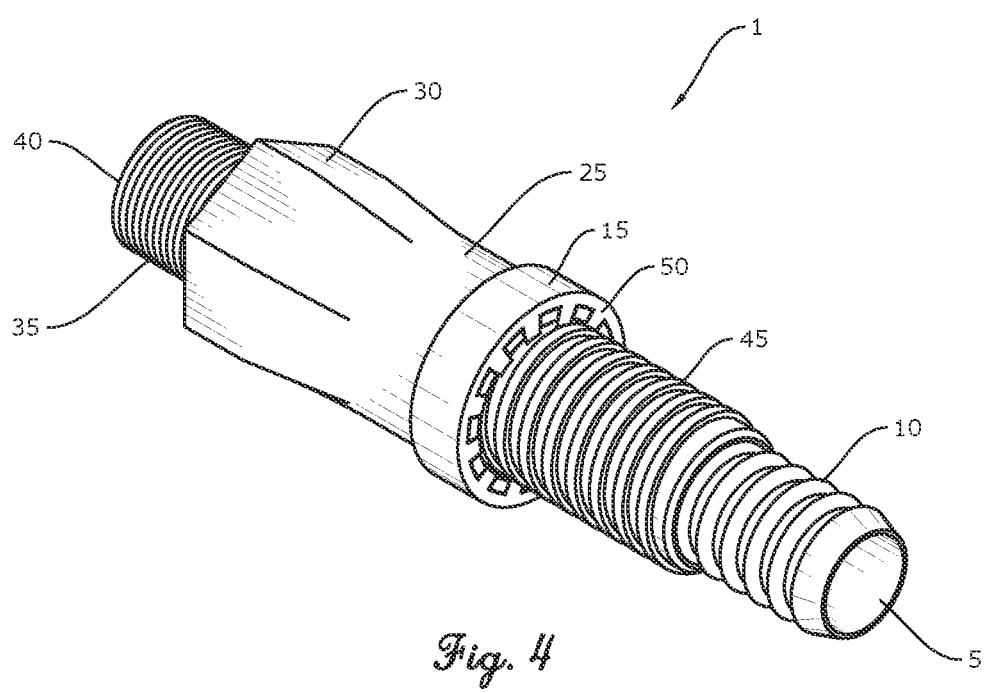
FIG. 4 depicts one embodiment of a perspective view of an improved irrigation-system-coupling device, in its extended configuration, as viewed from its second end (that is, from the end that is adapted to be fit into irrigation-system hosing/tubing).
Figure 5:
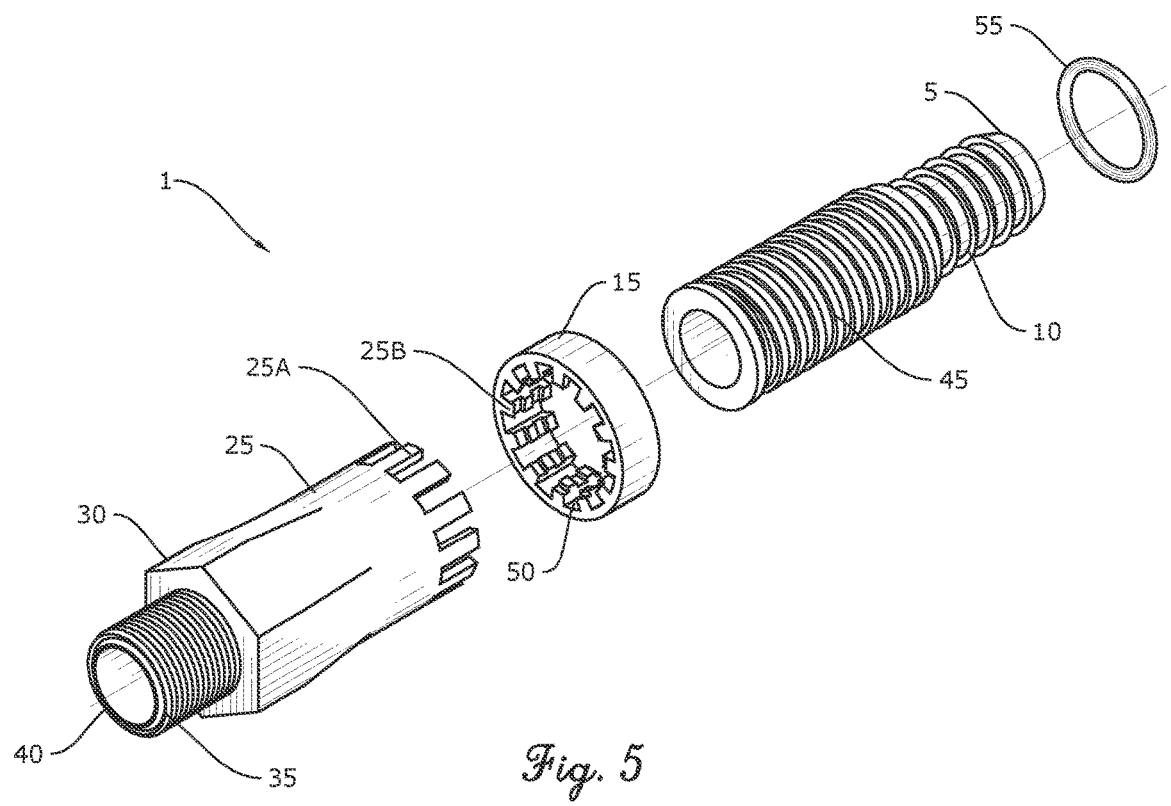
FIG. 5 depicts one embodiment of an exploded perspective view of an improved irrigation-system-coupling device, as viewed from its first end (that is, from the end that is adapted to be threaded into a valve housing).
Figure 6:
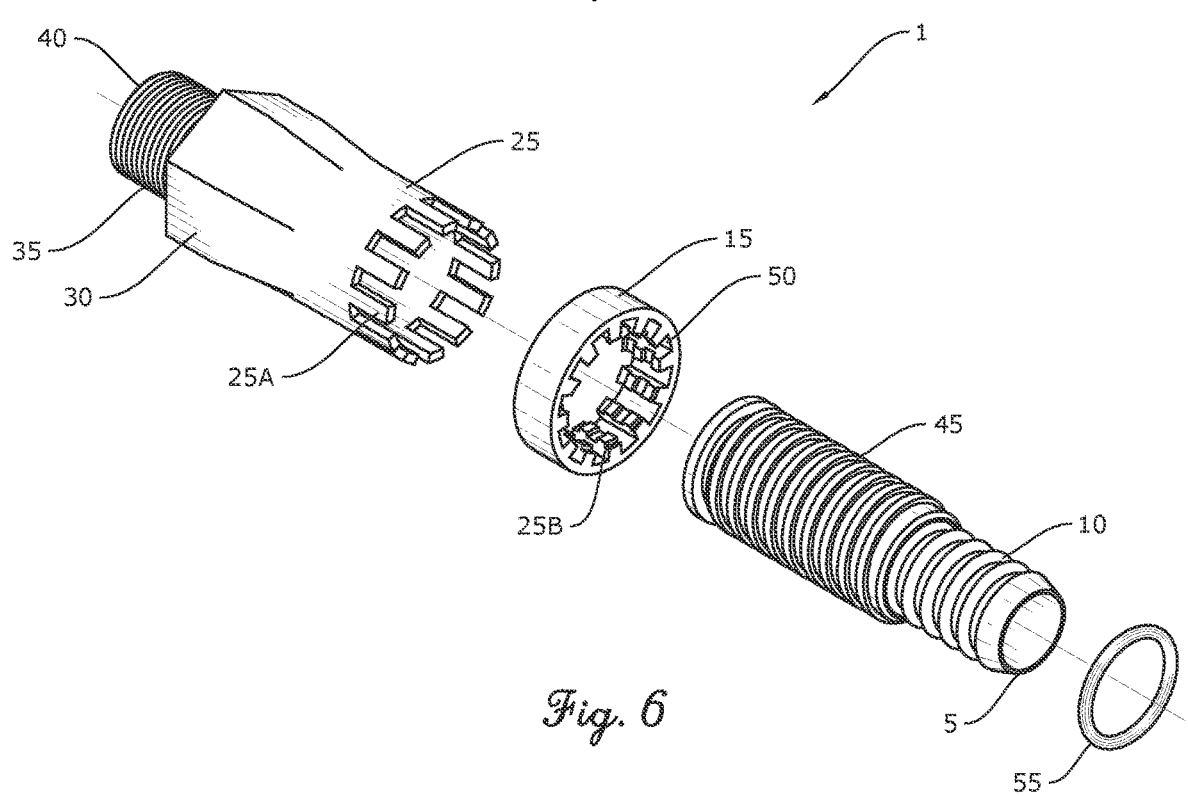
FIG. 6 depicts one embodiment of an exploded perspective view of an improved irrigation-system-coupling device, as viewed from its second end (that is, from the end that is adapted to be fit into irrigation-system hosing/tubing).
Figure 7:
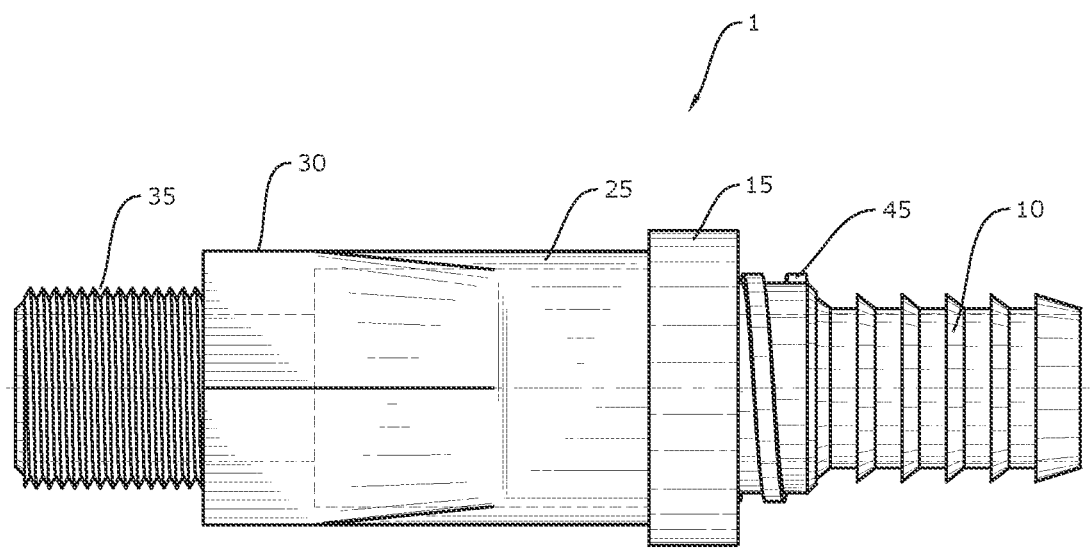
FIG. 7 depicts one embodiment of a side view of an improved irrigation-system-coupling device, in its non-extended configuration.
Figure 8:
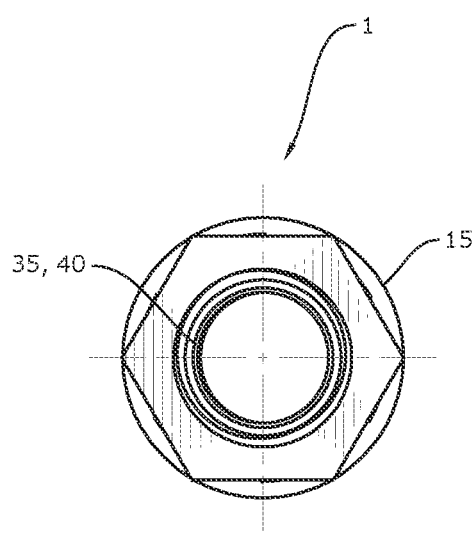
FIG. 8 depicts one embodiment of a first-end view of an improved irrigation-system-coupling device.
Figure 9:
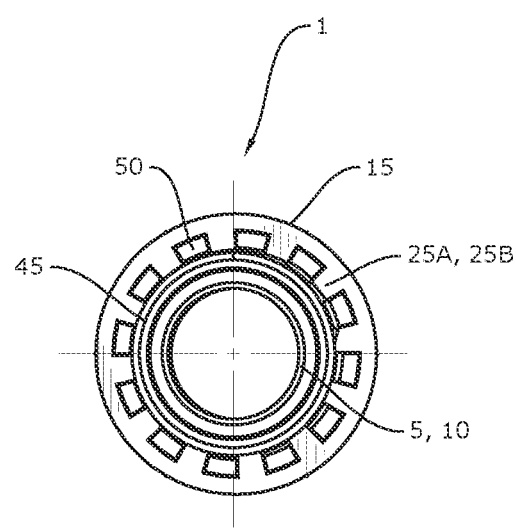
FIG. 9 depicts one embodiment of a second-end view of an improved irrigation-system-coupling device.
Figure 10:
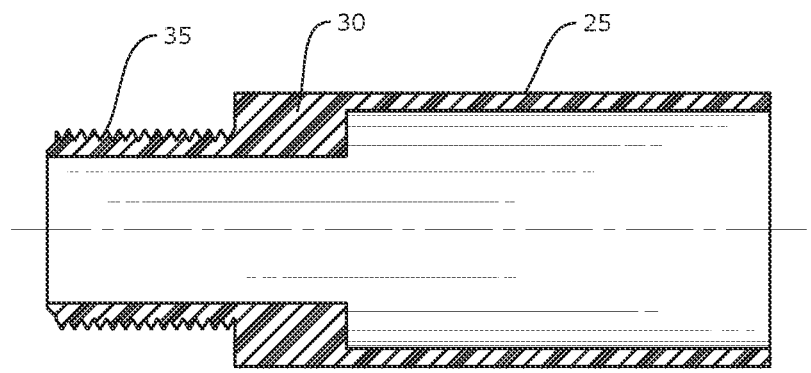
FIG. 10 depicts one embodiment of a side-cutaway view of the first-end housing of an improved irrigation-system-coupling device.
Figure 11:
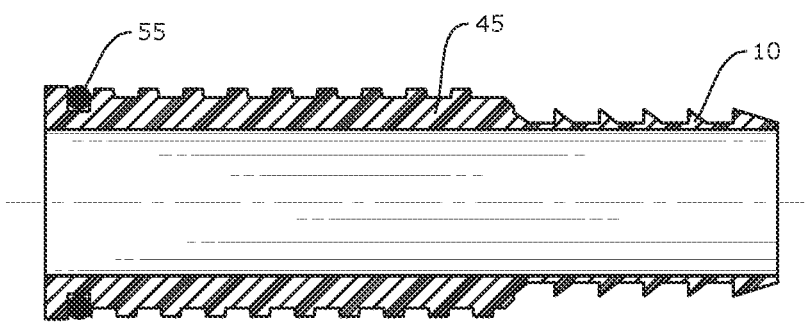
FIG. 11 depicts one embodiment of a side-cutaway view of the second-end housing of an improved irrigation-system-coupling device, which is sized and adapted to fit into the first-end housing shown in FIG. 10.
Figure 12:
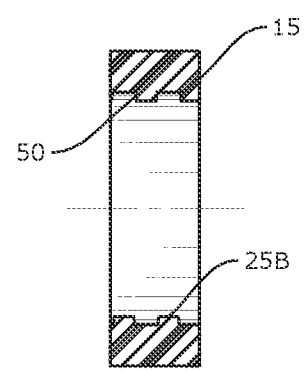
FIG. 12 depicts one embodiment of a side-cutaway view of the length-adjustment flange of an improved irrigation-system-coupling device, which has internal gear teeth adapted to engage with the lead-screw threads on the exterior of the second-end housing.

The inventive disclosures described herein pertain to an improved irrigation-system-coupling device that is designed to provide a coupling between polymeric irrigation-system hosing/tubing and a water-supply valve, such as solenoid-operated control/supply valves commonly used in automated irrigation systems, wherein coupling device incorporates an easy-to-use length-adjustable configuration. The length-adjustment configuration allows for easy installation in the field without the need to splice additional lengths of hosing/tubing in situations where various environmental conditions and/or necessitated repairs to or removal of sections of hoses/tubing has caused an extra gap between a supply-valve manifold housing and the end of the existing hose/tubing.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often, the manner of the coupling is related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

As applicable, the terms "about", "approximately", or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

III. An Improved Irrigation-System-Coupling Device

This Section III is directed generally to an improved irrigation-system-coupling device that is designed to provide a coupling between polymeric irrigation-system hosing/tubing and a water-supply valve, such as solenoid-operated control/supply valves commonly used in automated irrigation systems. Refer to FIGS. 1 through 23.

Overall, the improved irrigation-system-coupling device 1 is designed to allow a user to easily longitudinally expand the coupler length by way of the use of two concentric, telescopically fitted, fluid-channeling, housings/coupling members 25, 10, wherein the coupling member 10 that is disposed within the first-end housing 25 can be longitudinally move in or out by means of lead-screw threads 45 that engage with the interior teeth 25B of a length-adjustment flange 15 that is coupled to first-end housing 25.

In an embodiment, the improved irrigation-system-coupling device 1 comprises a first-end-coupling member 35 featuring helical threads for coupling with a fluid-supply valve 65. The first-end coupling member 35 also comprises an opening 40 through which water or other fluids can flow to the other end of the improved irrigation-system-coupling device 1 and out the other opening 5. The first-end-coupling member 35 is part of the first-end housing 25, which also features a plurality of circumferentially disposed flat surfaces 30 so that a user can apply a wrench, a pair of channel locks, or similar tool in order to engage the helical threads of the first-end-coupling member 35 to a threaded female interface of a water-supply valve 65. At the opposite end of the first-end housing 25 (that is, at the end away from the threads 35), a plurality of flange-engagement fingers 25A are disposed, which are adapted to engage with a length-adjustment flange 15 that has one or more circumferential rows of interior gear teeth 25B between which the flange-engagement fingers 25A slide in and tightly fit. Importantly, the fingers 25A are shallow enough to allow the interior flange teeth 25B to extend beyond the flange-engagement fingers 25A and engage with the lead-screw threads 45 of the second-end-coupler member 10 when the length-adjustment flange 15 is rotated. When fully installed, the length-adjustment flange 15 is seated all the way to the base 20 of the plurality of flange-engagement fingers 25A, each of which are designed to snuggly fit within the gaps 50 between the interior flange gear teeth 25B. When the length-adjustment flange 15 is rotated, the entire first-end housing assembly 35, 25, 15 rotates with it and traverses a longitudinal path as the length-adjustment flange 15 is rotated up or down the lead-screw threads 45.

In variations, the length-adjustment flange 15 outer surfaces can include one or more flattened surfaces to allow a user to apply a wrench or channel locks to the flange 15 to aid in rotating the first-end housing 25 and flange 15 in order to lengthen or shorten the device 1. Importantly, the seal between the first-end housing 25 and the second-end coupling member 10 is maintained by one or more elastomeric O-rings 55 disposed in a channel at the first end of the second-end coupling member's 10 lead-screw threads 45.

In typical embodiments, the second-end-coupler member 10 has a plurality of parallel annular ridges, typically saw-toothed or barbed in shape, adapted to be inserted into a polymeric hose 60 or tube 60 to form an interference fit. When installed, with or without plumber's sealant, the second-end-coupler member's 10 fit is further secured by use of a hose clamp 70.

In some variations, the threads of the first-end coupling member 35 are a plurality of parallel annular ridges, typically saw-toothed or barbed in shape (see, e.g., FIGS. 18 through 21) adapted to be inserted into a polymeric hose 60. Similarly, in other variations, the second-end coupling member 10 features helical threads (see, e.g., FIGS. 14 though 17) for engagement into a threaded pipe fitting or valve housing instead of a plurality of parallel annular ridges.

In still more variations, the first-end coupler member 35, first-end housing 25, second-end coupler member 10, and lead-screw threads 45 are comprised of a material selected from the group consisting of polyvinyl chloride (PVC), chlorinated polyvinyl chloride (CPVC), cross-linked polyethylene (PEX), and corrosion-resistant metal, such as stainless steel or a copper alloy, or combinations thereof.

Finally, the sizing of the improved irrigation-system-coupling device 1 should be such as to match the sizes of the valves and tubing/hosing for the system.

IV. An Irrigation System Featuring an Improved Irrigation-System-Coupling Device This Section IV is directed generally to an improved irrigation system that includes one or more improved irrigation-system-coupling devices, as described in Section III above. Refer to FIGS. 1 through 13.

Figure 13:
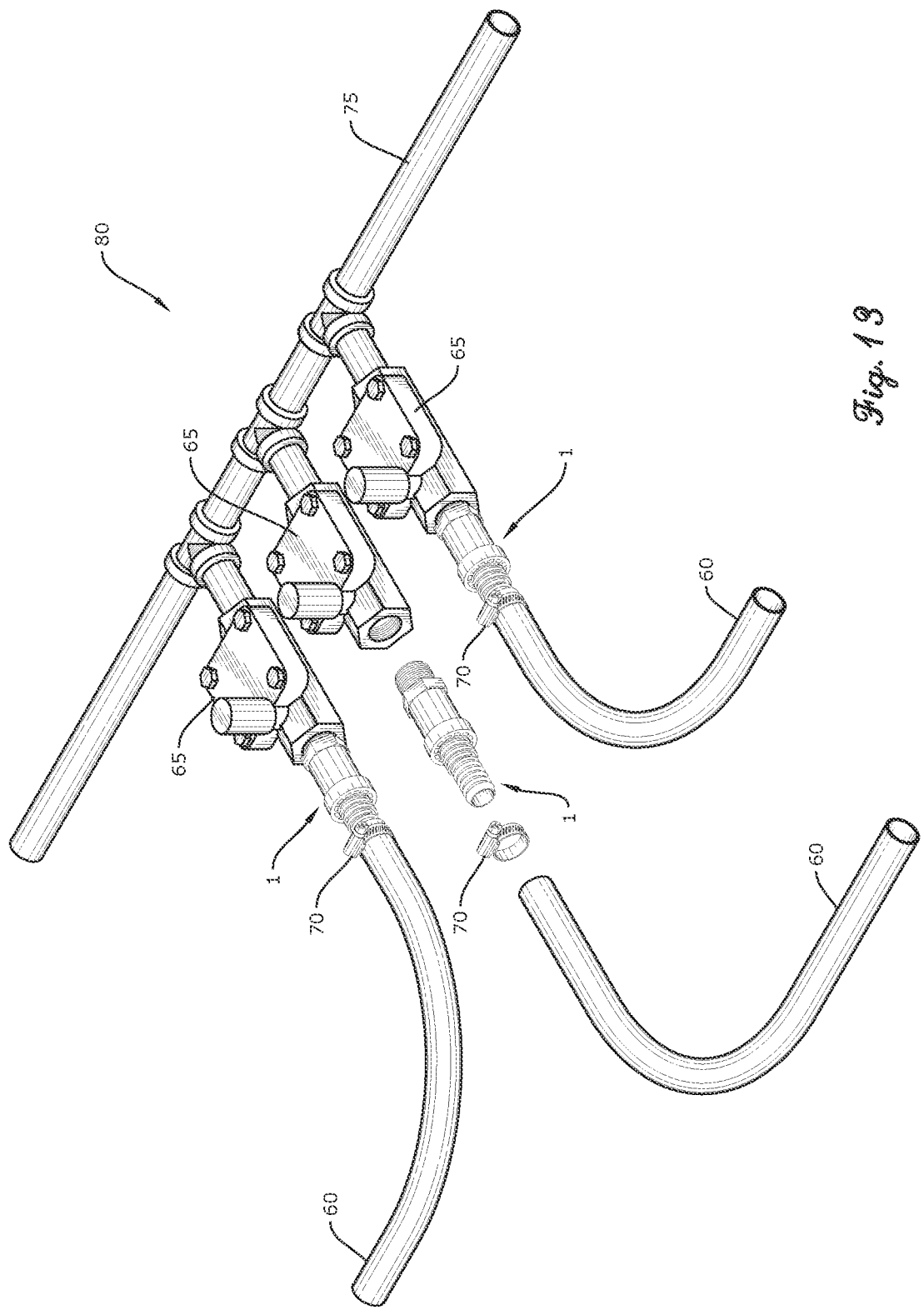
FIG. 13 depicts one embodiment of a perspective view of an example installation of three improved irrigation-system-coupling devices in an irrigation system, with one of the three installed coupling devices shown in an exploded view relative to the other system components.
Figure 14:
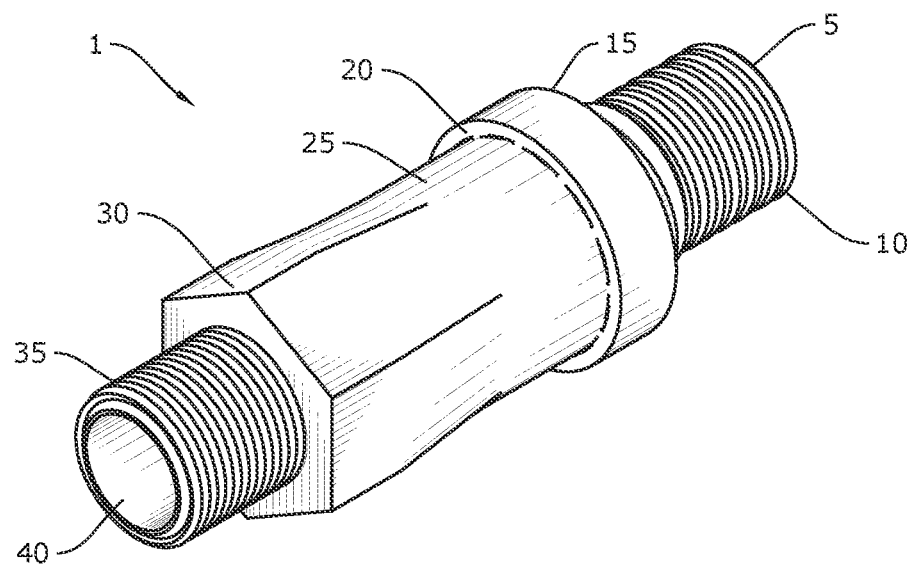
FIG. 14 depicts one alternative embodiment of a perspective view of an improved irrigation-system-coupling device, in its non-extended configuration, as viewed from its first end (that is, from the end that is adapted to be threaded into a valve housing), and with the extendable end depicting helical threads.
Figure 15:
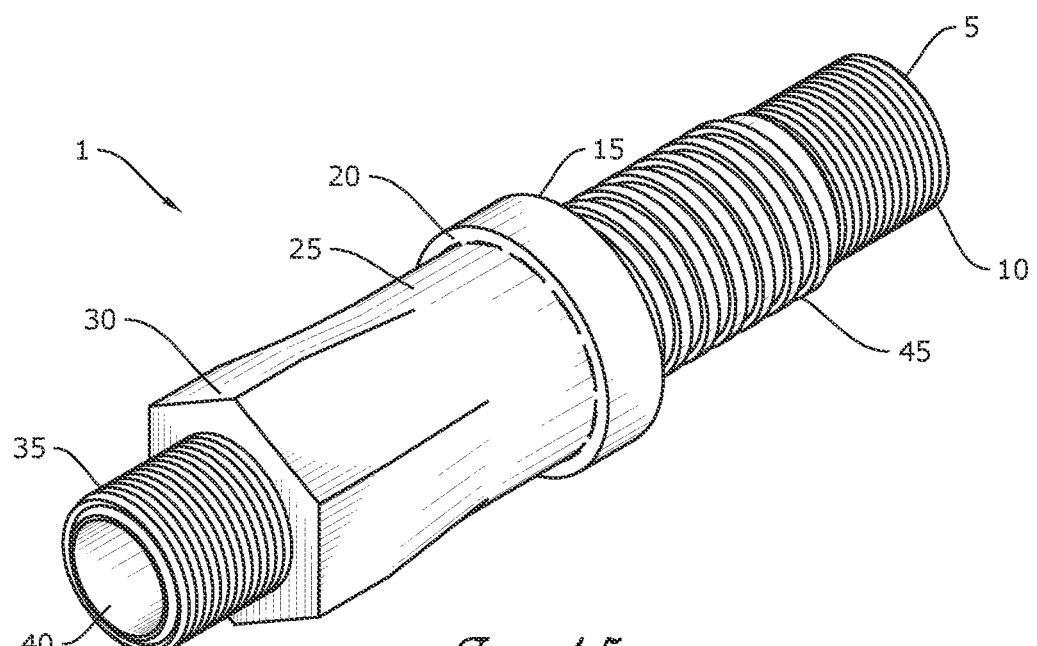
FIG. 15 depicts one alternative embodiment of a perspective view of an improved irrigation-system-coupling device, in its extended configuration, as viewed from its first end (that is, from the end that is adapted to be threaded into a valve housing), and with the extendable end depicting helical threads.
Figure 16:
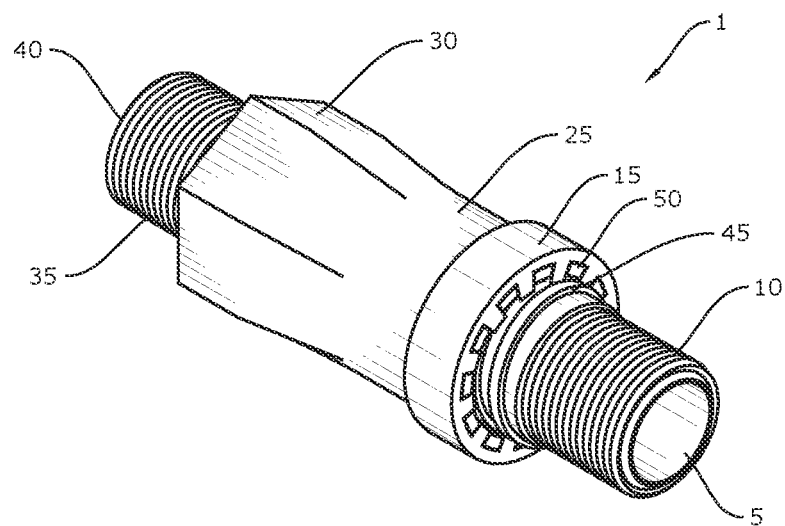
FIG. 16 depicts one alternative embodiment of a perspective view of an improved irrigation-system-coupling device, in its non-extended configuration, as viewed from its second end (that is, from the end that is adapted to be fit into irrigation-system hosing/tubing), and with the extendable end depicting helical threads.
Figure 17:
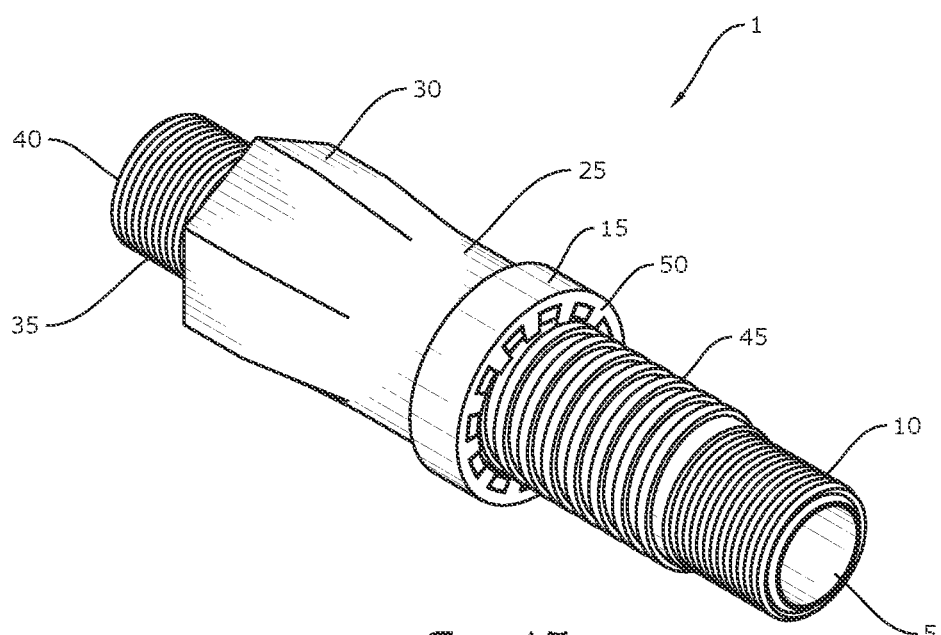
FIG. 17 depicts one alternative embodiment of a perspective view of an improved irrigation-system-coupling device, in its extended configuration, as viewed from its second end (that is, from the end that is adapted to be fit into irrigation-system hosing/tubing), and with the extendable end depicting helical threads.
Figure 18:
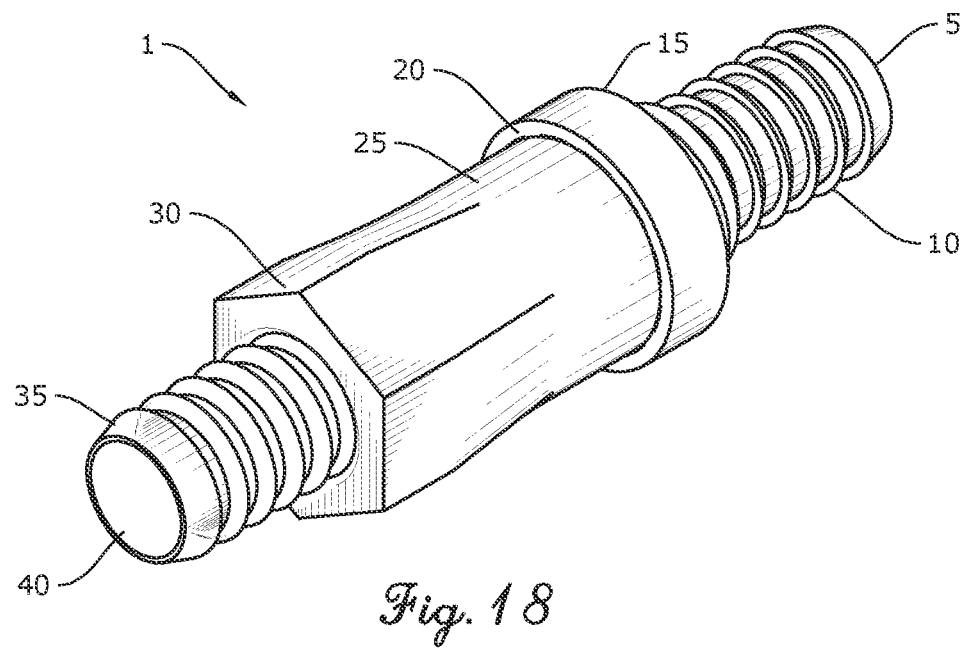
FIG. 18 depicts one alternative embodiment of a perspective view of an improved irrigation-system-coupling device, in its non-extended configuration, as viewed from its first end (that is, from the end that is adapted to be threaded into a valve housing), and with the non-extendable end depicting parallel annular ridges to facilitate an interference fit into another system component.
Figure 19:
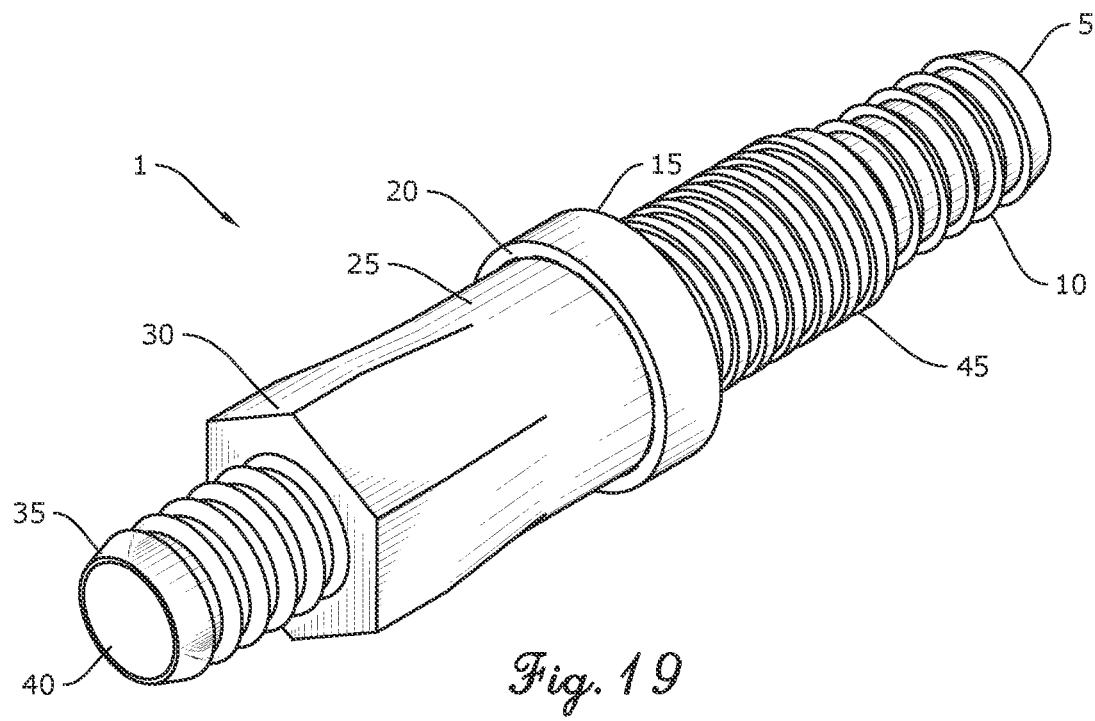
FIG. 19 depicts one alternative embodiment of a perspective view of an improved irrigation-system-coupling device, in its extended configuration, as viewed from its first end (that is, from the end that is adapted to be threaded into a valve housing), and with the non-extendable end depicting parallel annular ridges to facilitate an interference fit into another system component.
Figure 20:
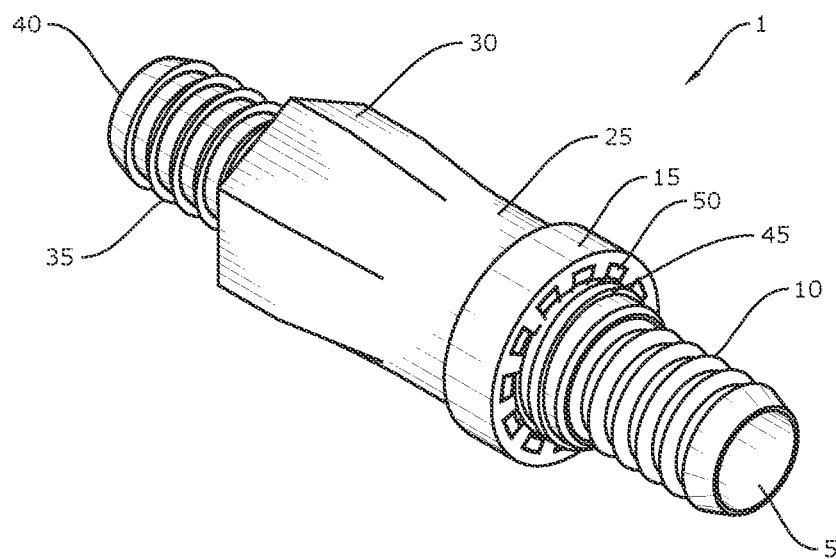
FIG. 20 depicts one alternative embodiment of a perspective view of an improved irrigation-system-coupling device, in its non-extended configuration, as viewed from its second end (that is, from the end that is adapted to be fit into irrigation-system hosing/tubing), and with the non-extendable end depicting parallel annular ridges to facilitate an interference fit into another system component.
Figure 21:
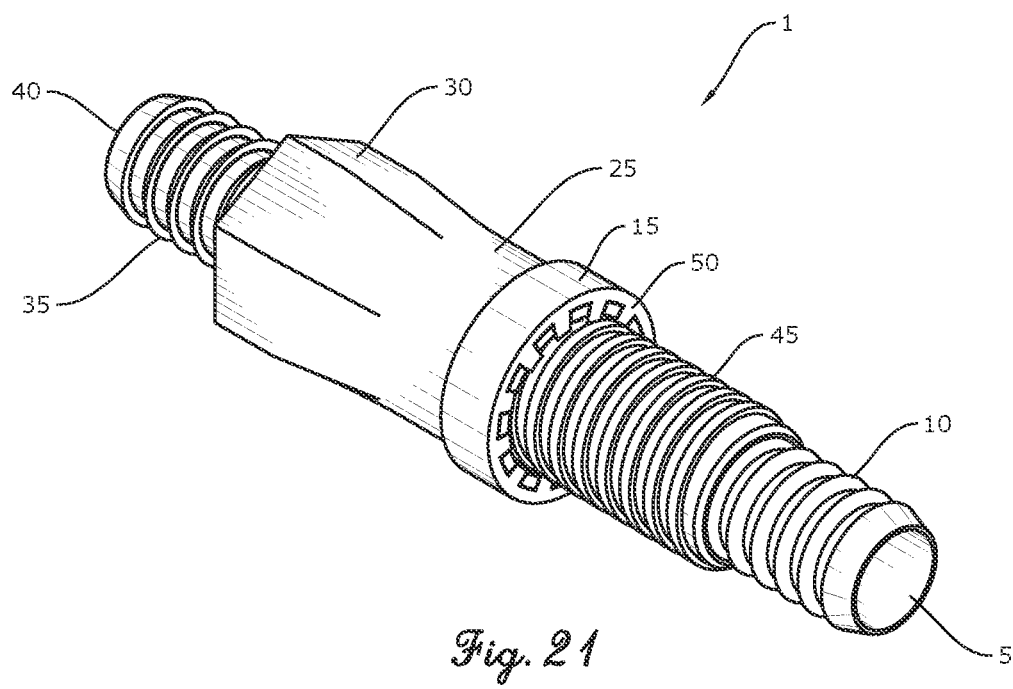
FIG. 21 depicts one alternative embodiment of a perspective view of an improved irrigation-system-coupling device, in its extended configuration, as viewed from its second end (that is, from the end that is adapted to be fit into irrigation-system hosing/tubing), and with the non-extendable end depicting parallel annular ridges to facilitate an interference fit into another system component.
Figure 22:
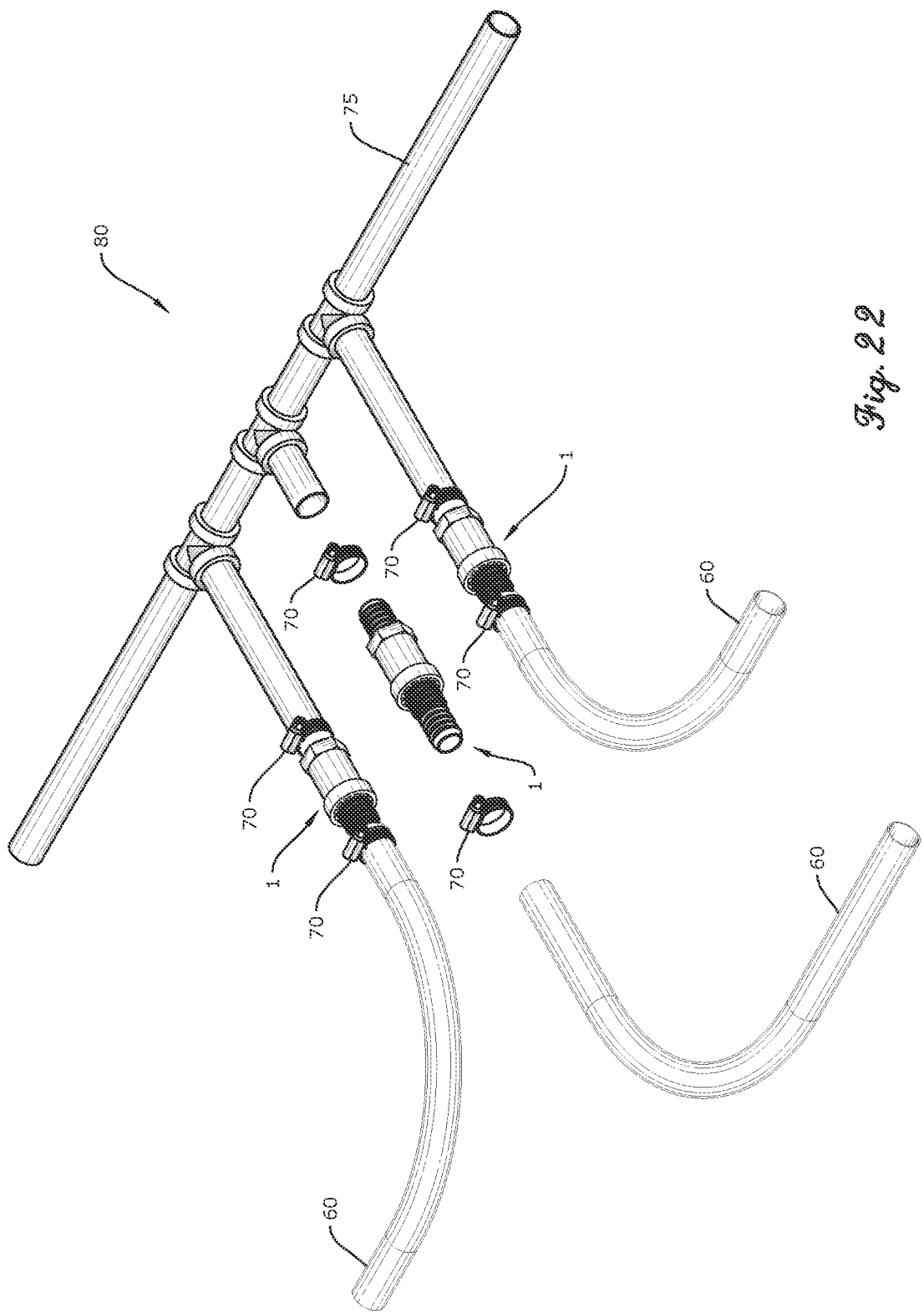
FIG. 22 depicts one embodiment of a perspective view of an example installation of three improved irrigation-system-coupling devices in an irrigation system between segments of hosing, with one of the three installed coupling devices shown in an exploded view relative to the other system components.
Figure 23:
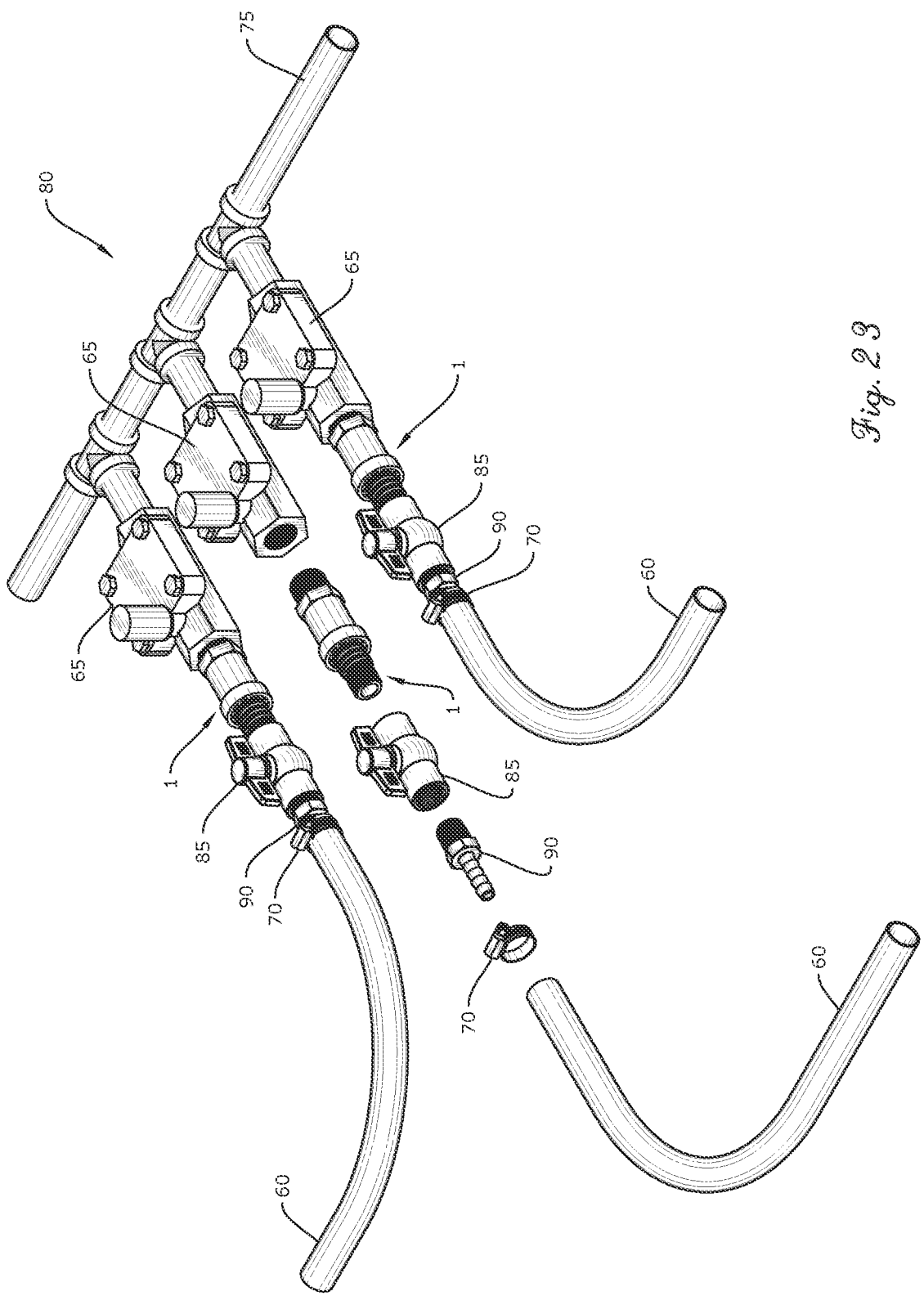
FIG. 23 depicts one embodiment of a perspective view of an example installation of three improved irrigation-system-coupling devices in an irrigation system between system valves, with one of the three installed coupling devices shown in an exploded view relative to the other system components.

In a typical embodiment, and referring to FIG. 13, the improved irrigation system's 80 water-supply manifold 75 has one or more solenoid-operated supply valves 65, each of feeds a section of hosing/tubing 60 via an improved irrigation-system-coupling device 1, as described in Section III above. In typical applications, the second-end-coupler member 10 of the improved irrigation-system-coupling device 1 has a plurality of parallel saw-toothed/barbed annular ridges that are inserted into the polymeric hose 60 or tube 60 to form an interference fit. In variations, a plumber's sealant can be included on the annular ridge 10 prior to insertion into the hosing/tubing 60.

When installed, with or without plumber's sealant, the second-end-coupler member's 10 fit is further secured by use of a hose clamp 70. The first-end-coupler member 35 and housing 25 are aligned with the threaded opening of the valve housing 65 and the improved irrigation-system-coupling device 1 is extended to the length necessary and the helical threads are engaged into the valve housing 65 by rotating the length-adjustment flange 15 along the lead-screw threads 45. In many variations, polytetrafluoroethylene PTFE) tape or a plumber's sealant is applied to the first-end-coupler threads 35 prior to threading the device 1 into the valve housing 65.

In variations, one of more improved irrigation-system-coupling devices 1 have first-end coupling member 35 annular protrusions that are a plurality of annular ridges (see, e.g., FIGS. 18 through 21) adapted to be inserted into a polymeric hose 60 (see, e.g., FIG. 22), and these versions of the improved irrigation-system-coupling devices 1 are used to splice-together two sections of hosing/tubing 60.

In variations, one of more improved irrigation-system-coupling devices 1 have second-end coupling member 10 annular protrusions that are helical threads (see. e.g., FIGS. 14 through 17) adapted to be threaded into a system component (such as a valve 85 and/or threaded hose adapter 90) used to couple two system components, such as valves 85 (see, e.g., FIG. 23), and these versions of the improved irrigation-system-coupling devices 1 are used to splice-together two sections of hosing/tubing 60.

V. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An irrigation-system-coupling device, comprising:
   a first-end-coupler member having a proximal end and a distal end, and annular protrusions disposed at the proximal end for engagement with another irrigation-system fluid-conduit component;
   a second-end-coupler member having a proximal end and a distal end, adapted to be concentric and telescopically fitted within said first-end-coupler member, wherein:
      a set of lead-screw threads is helically disposed around at least one-third of the longitudinal length of the proximal end of said second-end-coupler member, and
      annular protrusions at the distal end for engagement with another irrigation-system fluid-conduit component; and
   a length-adjustment flange coupled to the distal end of said first-end-coupler member, wherein:
      said length-adjustment flange has at least one concentrically disposed set of gear teeth along its interior surface, which slidably engage with said lead-screw threads, whereby said first-end-coupler member can move linearly with respect to said second-end-coupler member as said length-adjustment flange, which is coupled to said second-end-coupler member, is rotated about the longitudinal axis of the irrigation-system-coupling device.

2. The irrigation-system-coupling device of claim 1, further comprising at least one O-ring disposed about the distal end of said second-end-coupler member in order to provide a seal between said first-end coupler member and said second-end-coupler member.

3. The irrigation-system-coupling device of claim 1, further comprising a plurality of flattened surfaces disposed about the exterior of said first-end-coupler member in order to facilitate the use of a wrench or other tool to grip the first-end-coupler member as it is turned to facilitate engagement of the threads of said first-end-coupler member with another irrigation-system component.

4. The irrigation-system-coupling device of claim 1, wherein the annular protrusions on said first-end-coupler member are helical threads to facilitate screwing into a threaded bore.

5. The irrigation-system-coupling device of claim 1, wherein the annular protrusions on said first-end-coupler member is a plurality of parallel annular ridge to facilitate and interference fit into polymeric tubing or hosing.

6. The irrigation-system-coupling device of claim 1, wherein the annular protrusions on the distal end of said second-end-coupler member are helical threads to facilitate screwing into a threaded bore.

7. The irrigation-system-coupling device of claim 1, wherein the annular protrusions on the distal end of said second-end-coupler member is a plurality of parallel annular ridges to facilitate and interference fit into polymeric tubing or hosing.

8. The irrigation-system-coupling device of claim 1, wherein:
   the annular protrusions on said first-end-coupler member are helical threads to facilitate screwing into a threaded bore; and
   the annular protrusions on the distal end of said second-end-coupler member is a plurality of parallel annular ridges to facilitate and interference fit into polymeric tubing or hosing.

9. The irrigation-system-coupling device of claim 1, wherein:
   the annular protrusions on said first-end-coupler member is a plurality of parallel annular ridges to facilitate and interference fit into polymeric tubing or hosing; and
   the annular protrusions on the distal end of said second-end-coupler member is a plurality of parallel annular ridges to facilitate and interference fit into polymeric tubing or hosing.

10. The irrigation-system-coupling device of claim 1, wherein said first-end-coupler member, said second-end-coupler member, and said length-adjustment flange are mostly comprised of a material selected from the group consisting of polyvinyl chloride (PVC), chlorinated polyvinyl chloride (CPVC), cross-linked polyethylene (PEX), stainless steel, and copper alloy, or combinations thereof.

11. An irrigation system, said irrigation system having a water-supply manifold with at least one water-supply valve that supplies downstream polymeric tubing or hosing, comprising at least one improved irrigation-system-coupling device according to claim 1.

12. The irrigation system of claim 11, wherein:
   said at least one improved irrigation-system-coupling device has annular protrusions on said first-end-coupler member that are helical threads to facilitate screwing into a threaded bore;
   said at least one improved irrigation-system-coupling device has annular protrusions on the distal end of said second-end-coupler member that is a plurality of parallel annular ridges to facilitate and interference fit into polymeric tubing or hosing; and
   said at least one improved irrigation-system-coupling device is installed between said at least one water-supply valve and a section of polymeric tubing or hosing.

13. The irrigation system of claim 11, wherein:
   said at least one improved irrigation-system-coupling device has annular protrusions on said first-end-coupler member that are parallel annular ridges to facilitate and interference fit into polymeric tubing or hosing;
   said at least one improved irrigation-system-coupling device has annular protrusions on the distal end of said second-end-coupler member that is a plurality of parallel annular ridges to facilitate and interference fit into polymeric tubing or hosing; and
   said at least one improved irrigation-system-coupling device is installed between two sections of polymeric tubing or hosing.

14. The irrigation system of claim 11, wherein:
Said at least one improved irrigation-system-coupling device has annular protrusions on said first-end-coupler member that are helical threads to facilitate screwing into a threaded bore;
said at least one improved irrigation-system-coupling device has annular protrusions on the distal end of said second-end-coupler member that are helical threads to facilitate screwing into a threaded bore; and
said at least one improved irrigation-system-coupling device is installed between two system components, each system component having a threaded bore to connect to.

15. The irrigation system of claim 11, wherein said at least one improved irrigation-system-coupling device further comprises at least one O-ring disposed about the distal end of said second-end-coupler member in order to provide a seal between said first-end coupler member and said second-end-coupler member.

16. The irrigation system of claim 11, wherein said at least one improved irrigation-system-coupling device further comprises a plurality of flattened surfaces disposed about the exterior of said first-end-coupler member in order to facilitate the use of a wrench or other tool to grip the first-end-coupler member as it is turned to facilitate engagement of the threads of said first-end-coupler member with another irrigation-system component.

17. A method of making an irrigation-system-coupling device, comprising the steps of:
providing a first-end-coupler member having a proximal end and a distal end, and annular protrusions disposed at the proximal end for engagement with another irrigation-system fluid-conduit component;
providing a second-end-coupler member having a proximal end and a distal end, adapted to be concentric and telescopically fitted within said first-end-coupler member, wherein:
a set of lead-screw threads is helically disposed around at least one-third of the longitudinal length of the proximal end of said second-end-coupler member, and
annular protrusions disposed at the distal end for engagement with another irrigation-system fluid-conduit component; and
providing a length-adjustment flange coupled to the distal end of said first-end-coupler member, wherein:
said length-adjustment flange has at least one concentrically disposed set of gear teeth along its interior surface, which slidably engage with said lead-screw threads, whereby said first-end-coupler member can move linearly with respect to said second-end-coupler member as said length-adjustment flange, which is coupled to said second-end-coupler member, is rotated about the longitudinal axis of the irrigation-system-coupling device.

18. The method of claim 17, further comprising the step of providing at least one O-ring disposed about the distal end of said second-end-coupler member in order to provide a seal between said first-end coupler member and said second-end-coupler member.

19. The method of claim 17, further comprising the step of providing a plurality of flattened surfaces disposed about the exterior of said first-end-coupler member in order to facilitate the use of a wrench or other tool to grip the first-end-coupler member as it is turned to facilitate engagement of the threads of said first-end-coupler member with another irrigation-system component.

20. The method of claim 17, wherein:
the type of annular protrusions on said first-end-coupler member are selected from the group consisting of:
helical threads to facilitate screwing into a threaded bore and parallel, and
annular ridges to facilitate and interference fit into polymeric tubing or hosing;
the type of threads on the distal end of said second-end-coupler member are selected from the group consisting of:
helical threads to facilitate screwing into a threaded bore and parallel, and
annular ridges to facilitate and interference fit into polymeric tubing or hosing.

\* \* \* \* \*